(12) United States Patent
Matsunaga et al.

(10) Patent No.: US 7,359,334 B2
(45) Date of Patent: Apr. 15, 2008

(54) APPARATUS, PROGRAM AND METHOD FOR EFFICIENT DATA TRANSMISSION WITH A WIRELESS COMMUNICATIONS MODULE

(75) Inventors: Kozo Matsunaga, Kanagawa (JP); Masaharu Itoh, Kanagawa (JP); Kazuo Fujii, Kanagawa (JP)

(73) Assignee: Lenovo Singapore Pte. Ltd, Singapore (SG)

( * ) Notice: Subject to any disclaimer, the term of this patent is extended or adjusted under 35 U.S.C. 154(b) by 1236 days.

(21) Appl. No.: 10/227,335

(22) Filed: Aug. 23, 2002

(65) Prior Publication Data

US 2003/0053425 A1    Mar. 20, 2003

(30) Foreign Application Priority Data

Sep. 18, 2001    (JP) .............................. 2001-283763

(51) Int. Cl.
    *H04L 12/26*    (2006.01)
(52) U.S. Cl. ..................... 370/252; 455/67.11
(58) Field of Classification Search ...................... None
    See application file for complete search history.

(56) References Cited

U.S. PATENT DOCUMENTS 5,794,146 A * 8/1998 Sevcik et al. ............... 455/434
6,263,200 B1 * 7/2001 Fujimoto ................. 455/343.5
6,345,180 B1 * 2/2002 Reichelt ................... 455/404.1
6,934,547 B2 * 8/2005 Suzuki ....................... 455/441
6,952,571 B1 * 10/2005 Garrabrant et al. ....... 455/226.2
6,970,710 B1 * 11/2005 Kikuchi ..................... 455/462
7,062,250 B1 * 6/2006 Kosaka ..................... 455/343.5

FOREIGN PATENT DOCUMENTS

JP    11-331941    11/1999
JP    11331941     11/1999

\* cited by examiner

*Primary Examiner*—Huy D. Vu
*Assistant Examiner*—Rhonda Murphy
(74) *Attorney, Agent, or Firm*—Rogitz & Associates; Carlos Munoz-Bustamante

(57) ABSTRACT

A computer device, according to the present invention, includes: a power source judging means for judging whether power is supplied from an AC power source to the computer device capable of connecting with a wireless communications module which transmits and receives data to/from an access point; and a control means for controlling the timing of measuring the strength of connection with the above described access point based on judgment by the above described power source judging means. Therefore, by setting the timing of measuring the strength of connection with the access point based on whether or not the computer device is used at an almost fixed location, which in turn is judged by distinguishing the type of power source, it is possible to change the amounts of data transmitted and received by the wireless communications module.

5 Claims, 6 Drawing Sheets

[Figure 5]

APPARATUS, PROGRAM AND METHOD FOR EFFICIENT DATA TRANSMISSION WITH A WIRELESS COMMUNICATIONS MODULE

BACKGROUND OF THE INVENTION

1. Field of the Invention

The present invention mainly relates to a method of controlling a wireless communications module for transmitting and receiving data efficiently.

2. Description of Related Art

Small computer devices are often readily portable and are in widespread use today. Some examples of these types of portable devices include notebook PCs (personal computers) and PDAs (personal digital assistants), for instance. Often, these portable computer devices are also provided with various extended functions. Recently, wireless LAN modules have been installed as wireless communications modules to make it possible to transmit and receive data to/from the outside via a network. Once a wireless LAN module has been installed, the computer device can transmit and receive data to/from the outside easily even if it moves around as long as it can transmit and receive data to/from a wireless base station.

However, in some cases, the use of a wireless LAN module in a computer device to connect to an external network has lowered communication speeds in transmitting and receiving data. Thus, with a wireless LAN module, the quality of the connection (link quality) with the access point is often checked at certain intervals in order to ensure a reasonably accurate transmission and reception of data.

If connection quality is or becomes poor, however, it is necessary to find a new access point by scanning channels and establish communications with the new access point. In these instances, often no data can be transmitted or received during connection quality checking or channel scanning. Consequently, the net amount of transmitted and received data will be reduced.

SUMMARY OF THE INVENTION

Accordingly, there is a need for an apparatus, program and method for efficient data transmission with a wireless communications modules. Accordingly, it is an object of the present invention to provide an apparatus, program and method for efficient data transmission with a wireless communications modules To attain the above object, a computer device, according to the present invention, includes: a power source judging means for judging whether power is supplied from an AC power source to the computer device capable of connecting with a wireless communications module which transmits and receives data to/from an access point; and a control means for controlling the timing of measuring the strength of connection with the above described access point based on judgment by the above described power source judging means. Therefore, by setting the timing of measuring the strength of connection with the access point based on whether or not the computer device is used at an almost fixed location, which in turn is judged by distinguishing the type of power source, it is possible to change the amounts of data transmitted and received by the wireless communications module.

For example, since the control means stops measurement of the strength of the connection if the power source judging means judges that power is supplied from an AC power source, data can be transmitted and received even during measuring time when data cannot be transmitted and received conventionally.

The control means may set the timing slower if the power source judging means judges that power is supplied from an AC power source more so than if it is judged that power is not supplied from an AC power source.

BRIEF DESCRIPTION OF THE DRAWINGS

Other aspects, features, and advantages of the present invention will become more fully apparent from the following detailed description, the appended claims, and the accompanying drawings in which:

FIG. 4 is a diagram illustrating a relationship between amounts and time of data transmission/reception, in which: 4A represents a case where power is supplied from an AC adaptor; 4B represents a case where power is not supplied from an AC adaptor and radio field intensity is equal to or higher than a threshold; and, 4C represents a case where power is not supplied from an AC adaptor and a new access point is searched for;

DETAILED DESCRIPTION

Figure 1:
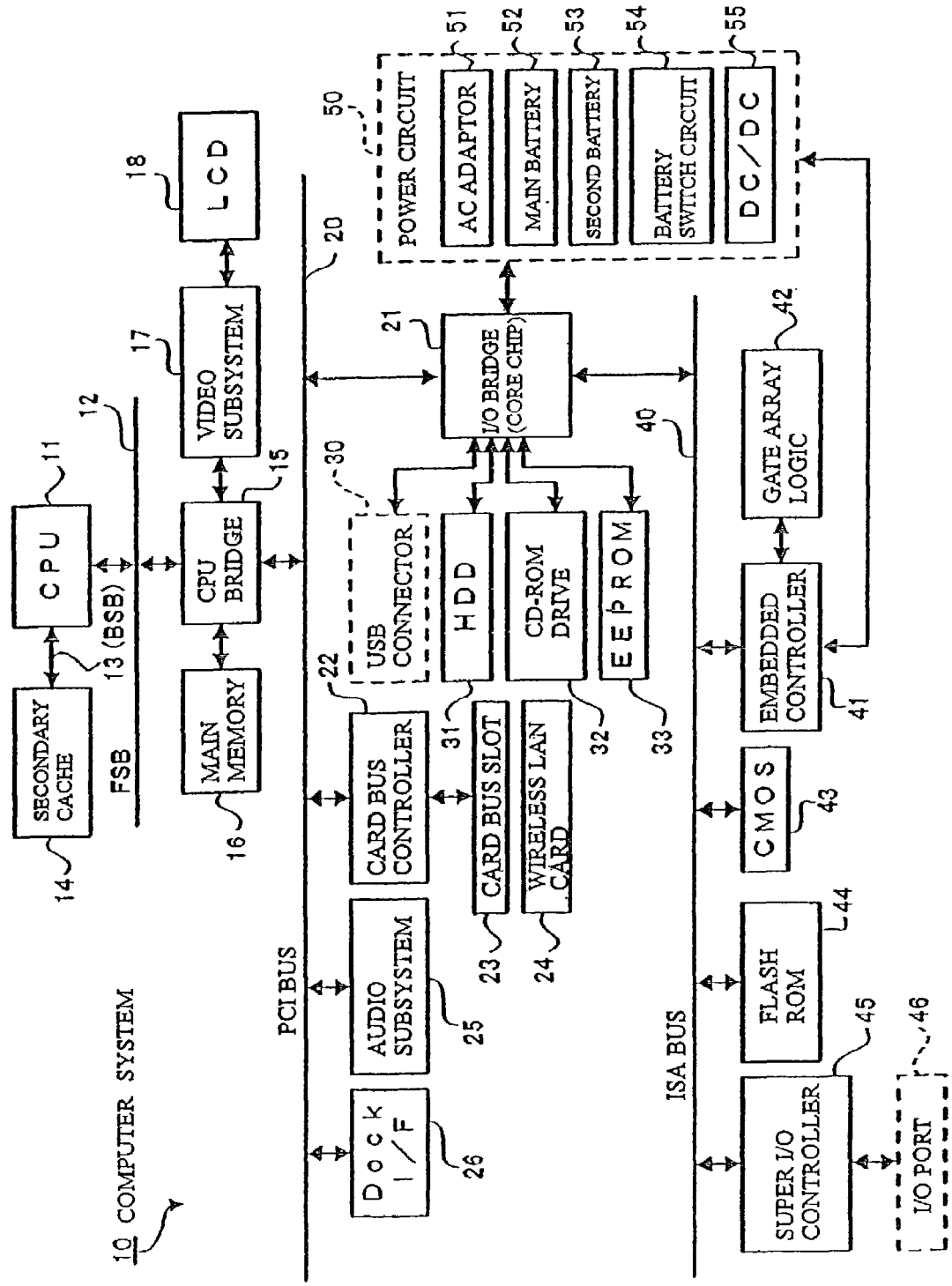
FIG. 1 is a diagram showing a hardware configuration of a computer system according to a preferred embodiment of the present invention.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings.

A computer device according to the present invention is provided with a wireless communications module and includes a movement judging means for judging whether the computer device has crossed a border beyond which it is necessary to reassign an access point to the wireless communications module; and a data transmit/receive means for transmitting and receiving data, wherein the data transmit/receive means transmits and receives more data within a given period if the movement judging means judges that the computer device is not moving than if it is judged that the computer device is moving.

To "cross a border beyond which it is necessary to reassign an access point" as used herein is indicative of a situation in which it is desirable to find another access point with better connection quality, as may be the case, for example, if the computer device moves 1 meter or more. The movement judging means can judge that the computer device is not moving, for example, if power is supplied to the computer device at a constant voltage. Also, it can judge that the computer device is not moving if the computer device is connected continuously to a docking station.

The computer device may further includes measuring means for measuring the strength of connection with an access point, wherein the data transmit/receive means may increase the amounts of transmitted and received data within the given period by reducing the frequency at which the strength of connection is measured by the measuring means within the given period.

The present invention is also a wireless communications module for transmitting and receiving data to/from an access point. The wireless communications module includes a reception section for receiving signals based on the type of power source which supplies power to the wireless communications module; and a control section for controlling data transmit/receive operations based on the signals.

Preferably, for the aspect of the wireless communications module, the control section increases the amounts of transmitted and received data in a single data transmit/receive operation if a signal is received by the reception section indicating that the power source is an AC power source over the case in which a signal indicating an AC power source is not received.

The present invention is also a control method for a wireless communications module. It is a control method of transmitting and receiving data to/from an external network by connecting with an access point and includes a step of judging whether or not the wireless communications module is moving; and a step of transmitting and receiving more data within a given period if it is judged that the wireless communications module is not moving than if it is judged that the wireless communications module is moving.

The movement as used herein generally means a relatively large movement after which a different access point may provide better connection quality. It does not include, for example, movements on a desk. Specifically, the movement judging step may judge that the wireless communications module is not moving if power is supplied from an AC power source. Also, the movement judging step may judge that the wireless communications module is not moving if a computer device connected with the wireless communications module is connected continuously to a docking station.

Besides, a control method for a wireless communications module according to the present invention is used in transmitting and receiving data to/from an external network. It includes a step of judging whether or not power is supplied from an AC power source; and a step of setting data transmission/reception time according to the judgment. Preferably, the step of setting the data transmission/reception time sets the data transmission/reception time to ta if it is judged that power is supplied from the AC power source and sets the data transmission/reception time to tb if it is judged that power is not supplied from the AC power source; and ta and tb satisfy the relationship ta>tb.

The present invention is also a program. The program aspect also provides for a computer device connected with a wireless communications module for transmitting and receiving data to/from an access point to implement a function of judging whether or not the computer device is moving; a function of measuring the strength of connection with the access point; and a function of setting the timing of measuring the strength of connection based on judgment as to whether the computer device is moving.

In this program aspect, the function of measuring the strength of connection may stop the measurement of the strength of connection if it is judged that the computer device is not moving. In this case, after stopping the measurement of the strength of connection, the function of measuring the strength of connection may be implemented upon instruction from the user.

Also, in this program aspect, the function of setting the timing may set the timing slower if it is judged that the computer device is not moving than if it is judged that the computer device is moving.

Besides, the present invention is also a storage medium. This storage medium stores a program to be executed by a computer device connected with a wireless communications module for transmitting and receiving data to/from an access point, in a form readable by the computer device, wherein the storage medium stores a program for making the computer device implement a function of judging whether or not the computer device is moving; and a function of transmitting and receiving more data within a given period if it is judged that the computer device is not moving than if it is judged that the computer device is moving.

Embodiments of the present invention will be further described in detail below with reference to the accompanying drawings.

First Embodiment

FIG. 1 shows a hardware configuration of a computer system (computer device) 10 according to a first embodiment. A computer device constituting the computer system 10 is configured, for example, as a notebook PC (notebook personal computer) compliant with OADG (Open Architecture Developers' Group) and running a certain OS (operation system).

In the computer system 10 shown in FIG. 1, a CPU 11, which functions as a brain of the entire computer system 10, runs various programs under the control of the OS. The CPU 11 is interconnected with various components via three levels of buses: FSB (Front Side Bus) 12 which is a system bus, PCI (Peripheral Component Interconnect) bus 20 which is a high-speed I/O bus, and ISA (Industry Standard Architecture) bus 40 which is a low-speed I/O bus. The CPU 11 speeds up processing by storing program code and data in cache memory. Recent CPUs 11 contain approximately 128 K bytes of SRAM as a primary cache. To compensate for shortage of capacity, approximately 512 K to 2 M bytes of a secondary cache 14 is provided via a BSB (Back Side Bus) 13 which is a dedicated bus. Incidentally, the secondary cache 14 may be connected to the FSB 12 instead of using the BSB 13, to avoid a package with a large number of terminals and thereby reduce costs.

The FSB 12 and PCI bus 20 are connected via a CPU bridge (host-PCI bridge) 15 called a memory/PCI chip. The CPU bridge 15 includes a memory control function for controlling access to main memory 16, a data buffer for absorbing the difference in the data transfer rate between the FSB 12 and PCI bus 20, etc. The main memory 16 is a writable memory used as a read-in area for reading executable programs for the CPU 11 or a working area for writing processing data of the executable programs. It consists, for example, of DRAM chips. For example, it comes standard with 64 MB, expandable to 320 MB. The executable programs include various drivers for hardware-controlling the OS and peripheral devices, application programs intended for specific jobs, and firmware such as BIOS (basic input/output system) stored in flash ROM 44 described later.

A video subsystem 17, which implements video-related functions, contains a video controller. The video controller processes drawing commands from the CPU 11 and writes processed drawing information in video memory as well as reads the drawing information from the video memory and outputs it as drawing data to a liquid crystal display (LCD) 18.

The PCI bus 20, which is capable of relatively high-speed data transfer, has standardized specifications: the data bus width is 32 or 64 bits, maximum operating frequency is 33 or 66 MHz, and a maximum data transfer rate is 132 or 528 MB/second. It is connected with an I/O bridge 21, card bus controller 22, audio subsystem 25, and docking station interface (Dock I/F) 26.

The card bus controller 22 is a dedicated controller for directly connecting bus signals of the PCI bus 20 to an interface connector (card bus) of a card bus slot 23. The card bus slot 23 accepts a wireless LAN card (wireless communications module) 24, which is a type of PC card. The docking station interface 26 is a piece of hardware for use in connecting a docking station (not shown), a function expansion of the computer system 10. When the notebook PC is plugged into the docking station, various hardware elements connected to an internal bus of the docking station is connected to the PCI bus 20 via the docking station interface 26.

The I/O bridge 21 has capability to bridge the PCI bus 20 and ISA bus 40. Also, it has DMA controller, programmable interrupt controller (PIC), programmable interval timer (PIT), IDE (Integrated Device Electronics) interface, USB (Universal Serial Bus), and SMB (System Management Bus) capabilities and incorporates a real time clock (RTC).

The DMA controller capability allows data to be transferred between peripheral devices such as an FDD and the main memory 16 without any CPU 11 intervention. The PIC capability runs a designated program (interrupt handler) in response to an interrupt request (IRQ) from a peripheral device. The PIT capability generates timer signals at designated intervals. Interfaces implemented by the IDE interface capability is connected with an IDE hard disk drive (HDD) 31 and ATAPI (AT Attachment Packet Interface) CD-ROM drive 32. Instead of the CD-ROM drive 32, other IDE devices such as a DVD (digital versatile disc) may be connected. The HDD 31, CD-ROM drive 32, and other auxiliary storage units are mounted in a rack called a "media bay" or "device bay" in the body of the PC. These auxiliary storage units, which come as standard, may sometimes be installed interchangeably and in an exclusive relationship with other devices such as an FDD or battery pack.

The I/O bridge 21 is provided with a USB port, which is connected, for example, with a USB connector 30 installed in a side wall of the body of the notebook PC. The I/O bridge 21 is also connected with EEPROM 33 via an SM bus. The EEPROM 33 is an electrically erasable non-volatile memory used to retain information such as passwords or supervisor passwords registered by users as well as the serial numbers of products.

Furthermore, the I/O bridge 21 is connected to a power circuit 50, which comprises an AC adaptor 51; battery switch circuit 54 for charging rechargeable (secondary) batteries—a main battery 52 and second battery 53—as well as for switching feed lines from an AC adaptor 51 and batteries; a DC/DC converter (DC/DC) 55 for generating steady DC voltages (5V, 3.3V, etc.) used in the computer system 10; and other circuits.

On the other hand, a core chip composing the I/O bridge 21 contains an internal register for managing the power status of the computer system 10 and logic (a state machine) for managing the power status of the computer system 10 including the operation of the internal register. The logic transmits and receives various signals to/from the power circuit 50, and thereby learns the actual conditions of power supply to the computer system 10. The power circuit 50 controls power supply to the computer system 10 according to instructions from the logic.

The ISA bus 40 has a lower data transfer rate than the PCI bus 20 (for example, the bus width is 16 bits and maximum data transfer rate is 4 MB/second). It is connected with an embedded controller (power source judging means) 41 connected to a gate array logic 42, CMOS 43, flash ROM 44, and Super I/O controller 45. Besides, the ISA bus 40 is also used to connect a keyboard/mouse controller or other peripheral devices which operate at a relatively low speed. The Super I/O controller 45, which is connected with an I/O port 46 (detecting element), drives the FDD and controls input/output of parallel data (PIO) via a parallel port and input/output of serial data (SIO) via a serial port.

The embedded controller 41 controls a keyboard which is not shown. Also, it is connected with the power circuit 50 and has a built-in power management controller (PMC) to share a power management function with the gate array 42.

Figure 2:
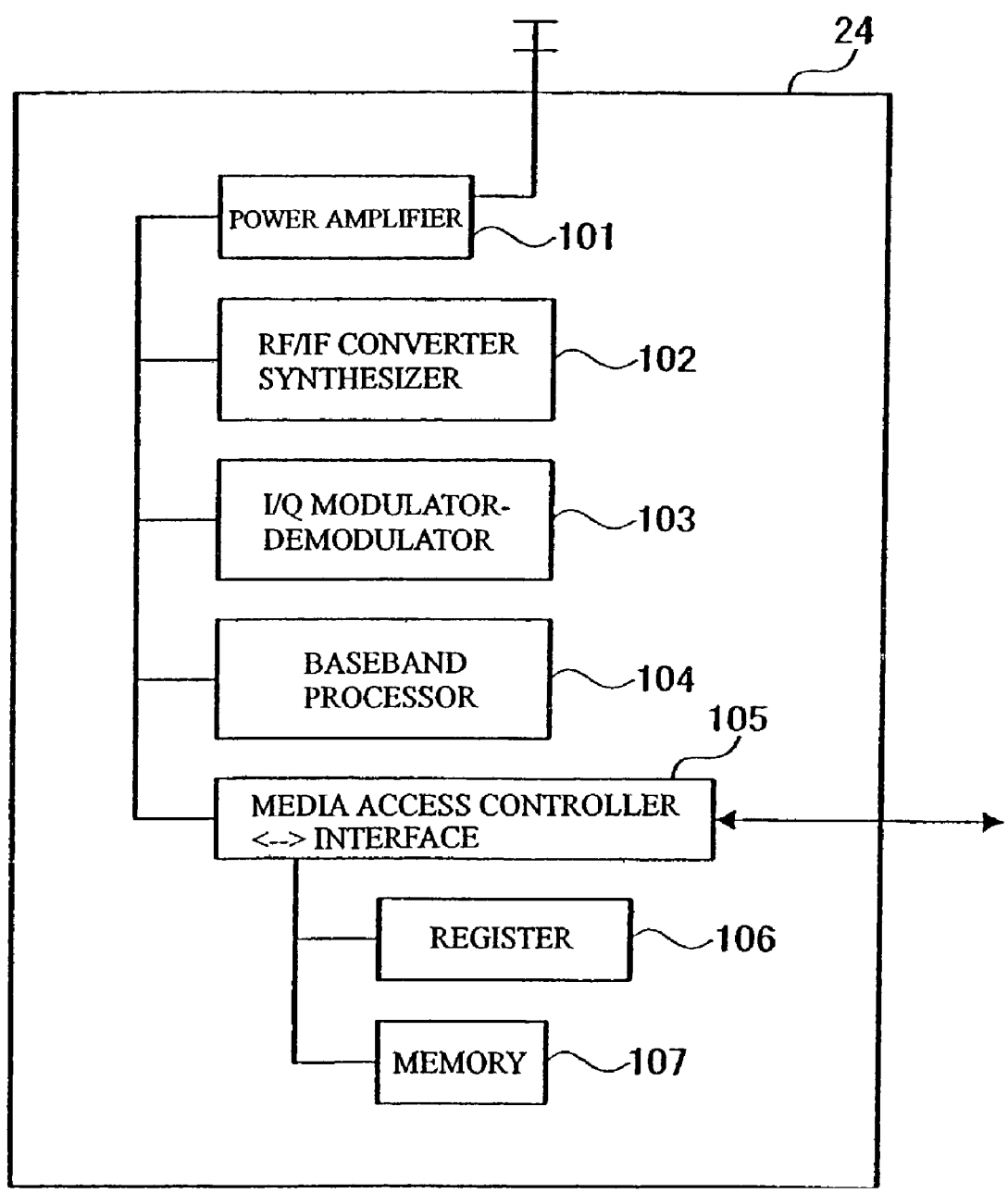
FIG. 2 is a diagram illustrating a concrete configuration of a wireless LAN card shown in FIG. 1.

FIG. 2 is a diagram illustrating a concrete configuration of the wireless LAN card 24 shown in FIG. 1.

The wireless LAN card 24 comprises a power amplifier 101 connected to an antenna, RF/IF converter synthesizer 102, I/Q modulator-demodulator 103, baseband processor 104, and media access controller 105 for controlling transmission and reception of radio waves. The media access controller 105 in turn comprises a register 106 and memory 107. The wireless LAN card 24 complies, for example, with the IEEE 802.11 standard. It may be a type that uses the 2.4-GHz band, the 5-GHz band, or infrared rays.

Normally, at the time of transmitting and receiving data with the outside via a wireless LAN, link quality with the access point is checked periodically to assure that the data is transmitted and received properly. If it turns out that radio field intensity is lower than a preset threshold, another access point is searched for to establish better link quality. By controlling this process, the first embodiment can transmit and receive data efficiently. Detailed description will be given below about how transmission and reception of data is controlled according to the first embodiment. The transmission and reception of data can be controlled by software which runs on the computer system 10 and controls the wireless LAN card 24. However, this control may also be performed by an OS (operating system) on the computer system 10.

Figure 3:
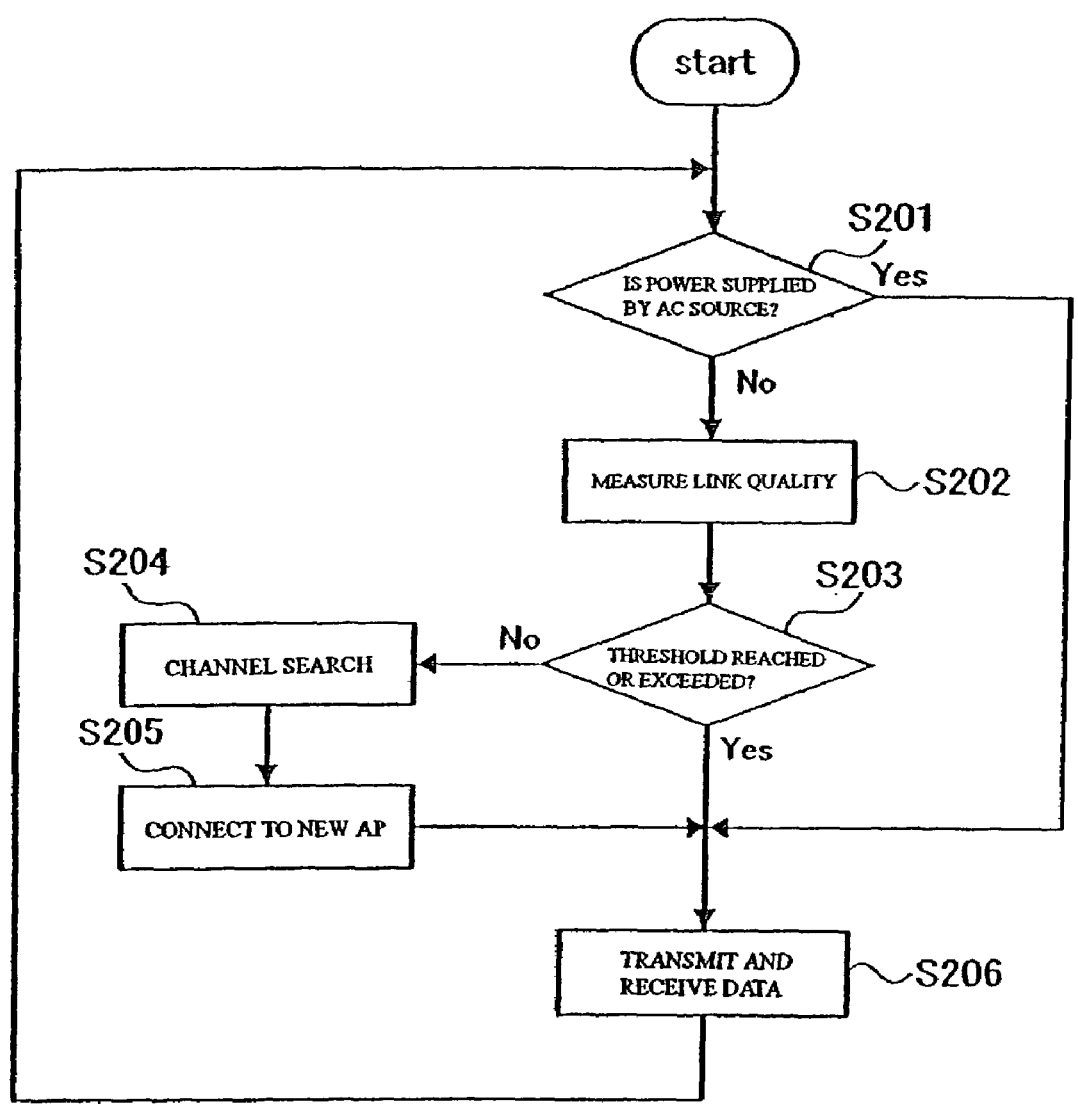
FIG. 3 is a diagram illustrating a flow of processes for controlling transmission and reception of data according to a preferred embodiment of the present invention.
Figure 4:
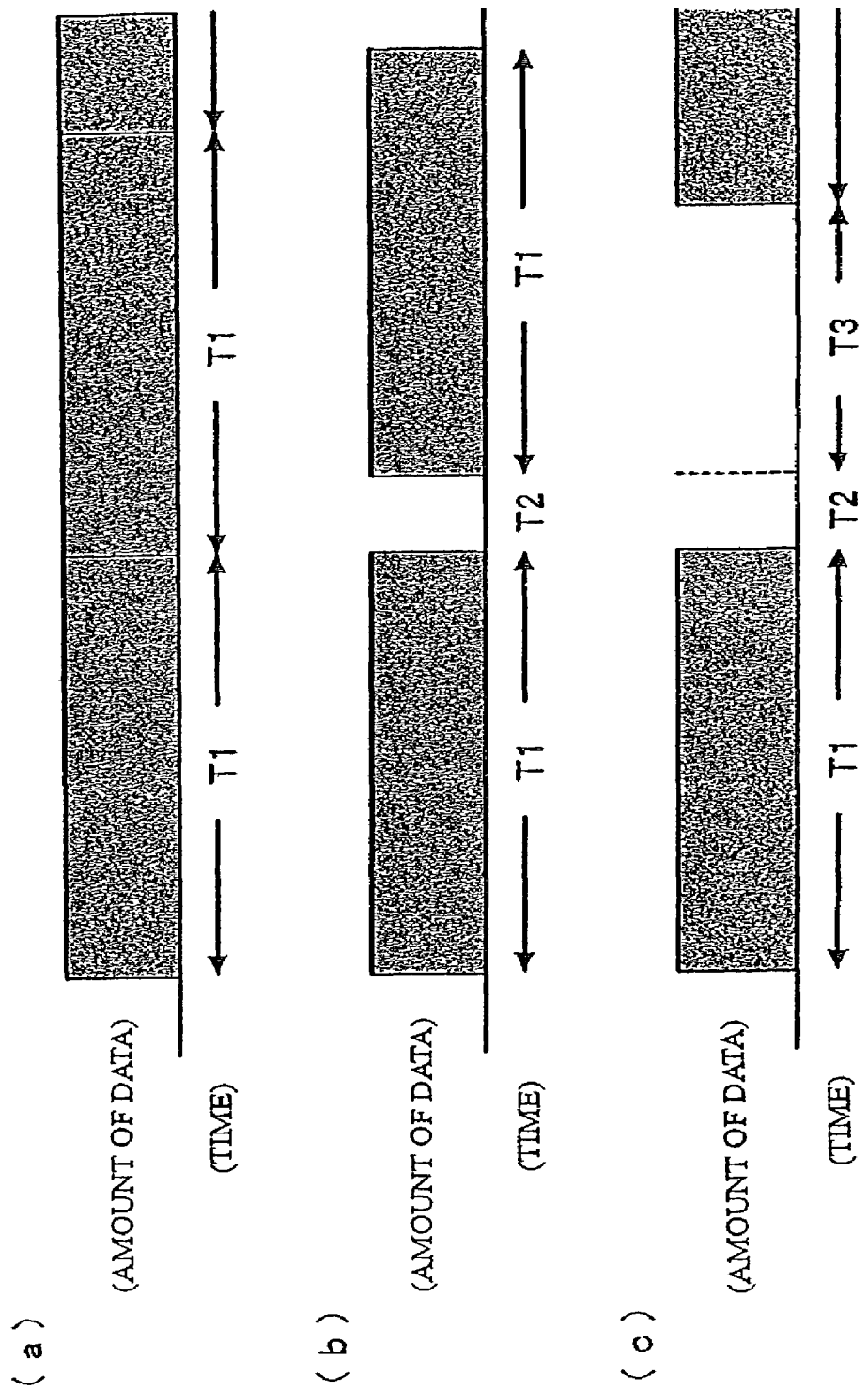

FIG. 3 is a diagram illustrating a flow of processes for controlling transmission and reception of data according to a preferred embodiment. FIGS. 4A, 4B, and 4C are diagrams illustrating the relationship between the amounts and time of data transmission/reception.

First, the computer system 10 judges whether or not the electric power for driving the computer system 10 is supplied from the AC adaptor 51 of the power circuit 50 (Step S201). This judgment is made based on a signal sent, for example, from the I/O bridge 21 of the computer system 10 or from the embedded controller 41.

If it is judged in Step S201 that power is supplied from the AC adaptor 51, data is transmitted and received via the wireless LAN card 24 (Step S206). The data transmission and reception is performed for a preset period of time (data transmission/reception time T1). After the data transmission/reception time T1 elapses, the system returns to Step S201, where it judges whether or not electric power is supplied from the AC adaptor 51. If it is judged continuously, for example, that power is supplied from the AC adaptor 51, the relationship between the amounts and time of data transmission/reception is represented as in FIG. 4A, meaning that data is transmitted and received continuously.

On the other hand, if it is judged in Step S201 that power is not supplied from the AC adaptor 51, meaning that power is supplied from the main battery 52, the system measures link quality (Step S202). Even if contact is established with an access point, data cannot be transmitted and received properly if the radio field intensity is lower than a certain level. Thus, the measurement of link quality involves measuring the field intensity of the radio waves transmitted from the access point. The time required to measure the link quality is referred to as measuring time T2. Incidentally, data transmission and reception via the wireless LAN card 24 stop during the measuring time T2. Based on this measurement, the system judges whether or not the radio field intensity is higher than the preset threshold (Step S203).

If it is judged in Step S203 that the radio field intensity is equal to or higher than the threshold, the system transmits and receives data for the data transmission/reception time T1 in Step S206 and then goes to Step S201, where it starts similar processes. While judgment is being made in Step S203, the relationship between the amounts and time of data transmission/reception is represented, for example, as in FIG. 4B. Specifically, after data is transmitted and received for the data transmission/reception time T1, the measuring time T2 exists until the next data transmission/reception time.

On the other hand, if it is judged in Step S203 that the radio field intensity is lower than the threshold, a channel search is carried out (Step S204) to find another access point with better connection quality. Then, connection is established with a new access point different from the one used to transmit and receive data so far (Step S205). The computer system 10 transmits and receives data to/from this access point in Step S206.

Incidentally, data transmission and reception via the wireless LAN card 24 stop during the channel search in Step S204. The time required for the channel search is referred to as search time T3. While the channel search is performed in Step S204, the relationship between the amounts and time of data transmission/reception is represented, for example, as in FIG. 4C. Specifically, after data is transmitted and received for the data transmission/reception time T1, periods when data is not transmitted and received—the measuring time T2 in Step S202 and the search time T3 in Step S204—exist until the next data transmission/reception.

Thus, according to the first embodiment, data transmission and reception is controlled in the manner described above. As can be seen by comparing FIGS. 4A, 4B, and 4C, the amounts of transmitted and received data depend on the flow of processes shown in FIG. 3. The relationship between the amounts and time of data transmission/reception shown in FIGS. 4B and 4C is much the same as with conventional wireless LAN cards 24. However, according to the first embodiment, the measurement of link quality in Step 202 is omitted when power is supplied from the AC adaptor 51. Instead, data is transmitted and received continuously as shown in FIG. 4A. Consequently, the total amount of transmitted and received data in the case shown in FIG. 4A is larger than in the case of FIG. 4B or 4C.

In the case of FIG. 4A, in which power is supplied from the AC adaptor 51 to the computer system 10, the power is often drawn from a receptacle at home or the office. Therefore, it is assumed that the computer system 10 is used almost at a fixed location. In such cases, once connection is established with a designated access point and certain link quality is obtained, there is not much need to measure link quality again or find a new access point by a channel search.

Thus, when power is supplied from the AC adaptor 51, the first embodiment makes it possible to omit link quality measurement and channel search, spend the saved time on transmission and reception of data, and thereby increase the total amount of data.

Incidentally, although according to the first embodiment described above, data is transmitted and received continuously without any link quality measurement as long as power is supplied from the AC adaptor 51, link quality may be checked at designated intervals, for example, every 5 minutes or every 15 minutes. Alternatively, it is also possible to display a message to the user stating that data is transmitted and received continuously and to measure link quality only when so directed by the user.

Second Embodiment

A second embodiment uses a computer system 10 with the same configuration as that of the first embodiment, but the method of controlling transmission and reception of data differs from that of the first embodiment. The method of controlling transmission and reception of data according to the second embodiment will be described below. Regarding processes similar to those of the first embodiment, detailed description will be omitted.

Figure 5:
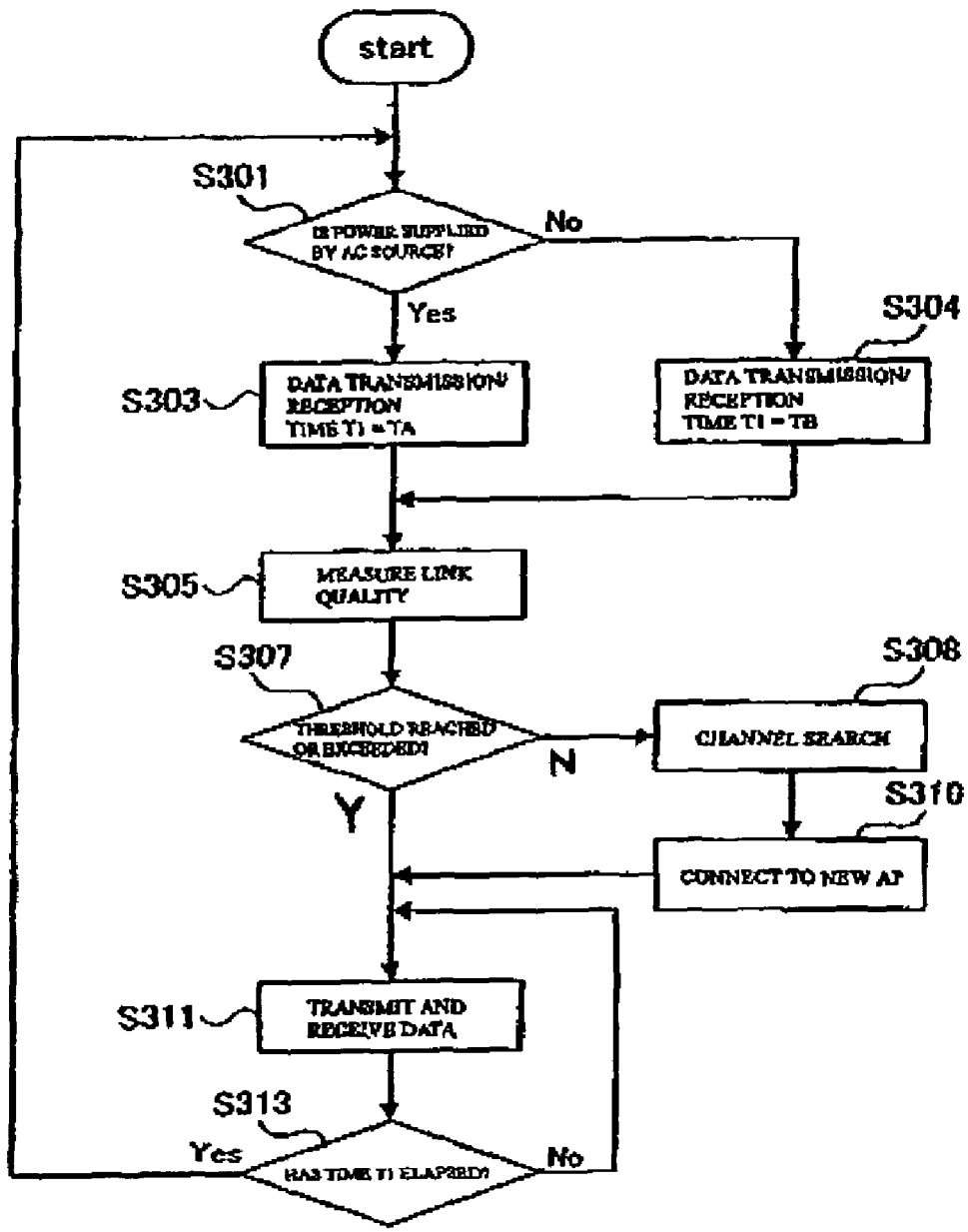
FIG. 5 is a diagram illustrating a flow of processes for controlling transmission and reception of data according to a according to a preferred embodiment of the present invention.

FIG. 5 is a diagram illustrating a flow of processes for controlling transmission and reception of data according to the second embodiment.

First, the computer system 10 judges whether or not the electric power for driving the computer system 10 is supplied from the AC adaptor 51 of the power circuit 50 (Step S301). If it is judged that power is supplied from the AC adaptor 51, the data transmission/reception time T1 is set to ta (Step S303). On the other hand, if it is judged that power is not supplied from the AC adaptor 51, the data transmission/reception time T1 is set to tb (Step S304). The data transmission/reception time T1 satisfies the condition ta>tb. For example, approximately, ta is in the range of 30 to 60 seconds and tb is in the range of 10 to 15 seconds.

After the data transmission/reception time T1 is set in Step S303 or Step S304, link quality is measured for the measuring time T2 (Step S305). Based on the results of the measurement, the system judges whether or not the radio field intensity is equal to or higher than the threshold (Step S307). If it is judged that the radio field intensity is lower than the threshold, a channel search is carried out for the search time T3 to find another access point (Step S308). Then, connection is established with the new access point (Step S310).

If it is judged in Step S307 that the radio field intensity is equal to or higher than the threshold, or after connection is established with the new access point in Step S310, the system transmits and receives data (Step S311). The system judges whether or not the data transmission/reception time T1 set in Step S303 or S304 has elapsed (Step S313). If it is judged that the data transmission/reception time T1 has not elapsed, the system continues transmission and reception of data in Step S311 until the data transmission/reception time T1 elapses. If it is judged in Step S313 that the data transmission/reception time T1 has elapsed, the system returns to Step S301 and repeats similar processes from the beginning.

Figure 6:
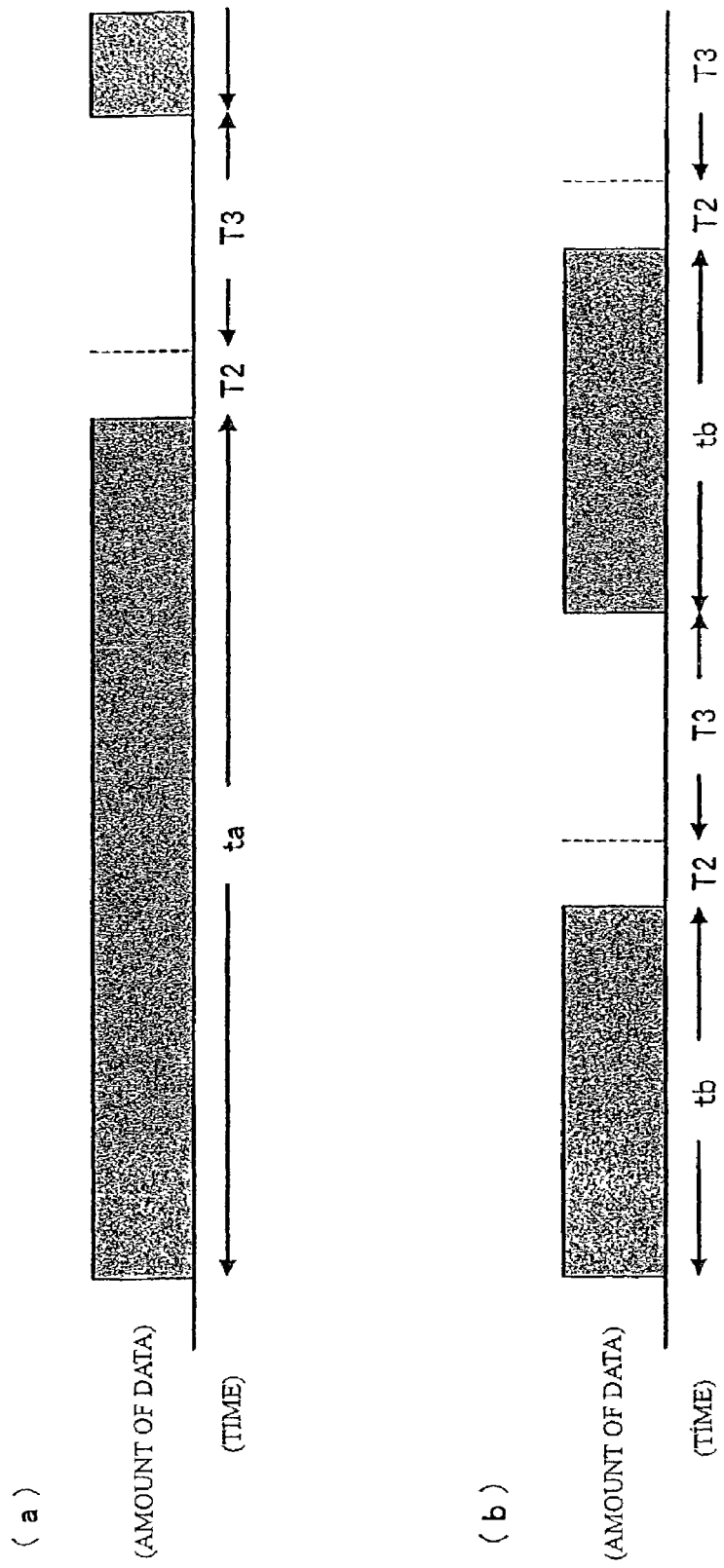
FIG. 6 is a diagram illustrating a relationship between the amounts and time of data transmission/reception, in which 6A represents a case where data transmission/reception time T1 is ta while 6B represents a case where data transmission/reception time T1 is "tb."

FIG. 6 is diagrams illustrating the relationship between the amounts and time of data transmission/reception.

FIG. 6A shows a case in which the data transmission/reception time T1 is ta because it was judged in Step S301 of the flow shown in FIG. 5 that the electric power was supplied from the AC adaptor 51. FIG. 6B shows a case in which the data transmission/reception time T1 is tb because it was judged that the electric power was not supplied from the AC adaptor 51. Incidentally, both FIGS. 6A and 6B assume that the radio field intensity in Step S307 of FIG. 5 is lower than the threshold and that link quality is measured for the measuring time T2 in Step S305.

Since the data transmission/reception time T1 satisfies the relationship ta>tb, the amounts of data transmitted and received continuously at a time is larger when the power is supplied from the AC adaptor 51 (FIG. 6A) than when the power is not supplied from the AC adaptor 51 (FIG. 6B). In other words, the total amount of transmitted and received data is larger in FIG. 6A than in FIG. 6B because the measuring time T2 and search time T3, which stop data transmission and reception, are inserted in a given period less frequently in the case of FIG. 6A than in FIG. 6B.

When power is supplied from the AC adaptor 51, it is assumed that the computer system 10 is used almost at a fixed location. In such cases, since link quality rarely changes sharply, once connection is established with a designated access point and certain link quality is obtained, the data transmission/reception time T1 can be made longer than normal data transmission/reception time, i.e., the interval between link quality measurements can be lengthened, increasing the amounts of transmitted and received data.

As described above, the first and second embodiments can increase the amounts of transmitted and received data by setting the frequency of link quality measurement and time of data transmission/reception according to the state of power supply.

A program for executing the processes described with reference to the above embodiments may also be provided by means of a storage medium or program-transmission device as follows.

That is, the program to be executed by a computer device only needs to be stored in a CD-ROM, DVD, memory, hard disk, or the like in computer-readable form.

The program-transmission device only needs to comprise storage means such as a CD-ROM, DVD, memory, hard disk, or the like which stores the program; and transmission means for reading the program from the storage means and transmitting it to the apparatus which executes the program, via a connector or via a network such as the Internet or a LAN. Such a program-transmission device is especially suitable for installing a program which runs processes such as those described above.

Also, it is possible to equip the wireless LAN card 24 with capabilities for receiving signals from a power source and setting the data transmission/reception time T1. For example, the wireless LAN card 24 may contain a data transmission/reception time setting section for setting the data transmission/reception time T1 and a judging section for making judgments based on signals sent from the computer device.

Besides, in the embodiments described above, the data transmission/reception time T1 may also be set according to whether or not the computer system 10 is used on the move or almost at a fixed location, which in turn is judged based on whether an AC power source is used, but this is not restrictive. For example, the data transmission/reception time T1 may be set by detecting connection with a designated docking station or a designated piece of hardware. Also, movement of the computer system 10 in excess of a certain distance may be detected by position sensing means employing an acceleration sensor or radio. However, the method based on the judgment as to whether or not an AC power source is used can be implemented relatively easily in computer systems 10 with conventional configuration.

A program for executing the processes described with reference to the above embodiments may be provided by means of a storage medium or program-transmission device as follows.

Specifically, the program to be executed by a computer device only needs to be stored in a CD-ROM, DVD, memory, hard disk, or the like in computer-readable form.

The program-transmission device only needs to comprise storage means such as a CD-ROM, DVD, memory, hard disk, or the like which stores the program; and transmission means for reading the program from the storage means and transmitting it to the apparatus which executes the program, via a connector or via a network such as the Internet or a LAN. Such a program-transmission device is suitable for installing a program which runs processes such as those described above.

The above embodiments use a wireless LAN module as the wireless communications module, but the present invention is not so limited. The present invention may use any wireless communications module, as long as it can conduct communications by switching among access points.

Also, although the above embodiments use a notebook PC as the computer device, the present invention does not impose particular restrictions on the computer device as long as it can transmit and receive data via a wireless communications module. For example, a portable terminal such as a PDA (personal digital assistant) or cell phone may also be used.

Besides, it is also possible to eclectically adopt the configuration used in the above embodiments or change it to another configuration as required without departing from the spirit and scope of the present invention.

Furthermore, it is possible to select the configuration used for the above embodiment or properly change the configuration to another configuration as long as the new configuration is not deviated from the gist of the present invention. As described above, according to the present invention, preferable cooling performance and noise characteristic can be realized even if a heat sink is decreased in size. Therefore, it is possible to contribute to the reduction of a computer in size and the improvement of the computer in performance by using the heat sink to cool a CPU or the like.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer device configured for connecting with a wireless communications module which transmits and receives data to/from an access point, comprising:
   a power source judging unit for judging whether or not power is supplied to said computer device from an AC power source; and
   a control unit for controlling a timing of measuring a strength of connection with said access point based on judgment by said power source judging unit, wherein said control unit stops measurement of said strength of connection if said power source judging unit judges that power is supplied from said AC power source.

2. A computer device configured for connecting with a wireless communications module which transmits and receives data to/from an access point, comprising:
   a power source judging unit for judging whether or not power is supplied to said computer device from an AC power source; and
   a control unit for controlling a timing of measuring a strength of connection with said access point based on judgment by said power source judging unit, wherein said control unit sets said timing to be slower if said power source judging unit judges that power is supplied from said AC power source than if it is judged that power is not supplied from said AC power source, said control unit stopping measurement of said strength of connection if said power source judging unit judges that power is supplied from said AC power source.

3. A program embodied on a computer-readable medium which wakes a computer device connected with a wireless communications module for transmitting and receiving data to/from an access point implement the functions of:
   judging whether or not said computer device is moving;
   measuring a strength of connection with said access point; and
   setting a timing of measuring said strength of connection based on judgment as to whether or not said computer device is moving, wherein after stopping the measurement of said strength of connection, the function of measuring the strength of connection is implemented upon instruction from a user.

4. The program according to claim 3, wherein the function of measuring said strength of connection stops the measurement of the strength of connection if it is judged that said computer device is not moving.

5. The program according to claim 3, wherein the function of setting said timing sets the timing slower if it is judged that said computer device is not moving than if it is judged that said computer device is moving.

* * * * *